United States Patent
Rautschek et al.

(10) Patent No.: US 8,084,566 B2
(45) Date of Patent: Dec. 27, 2011

(54) ANTIFOAMING COMPOSITIONS

(75) Inventors: Holger Rautschek, Nuenchritz (DE); Elisabeth Brehm, Burghausen (DE); Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/129,159

(22) PCT Filed: Nov. 16, 2009

(86) PCT No.: PCT/EP2009/065236
§ 371 (c)(1),
(2), (4) Date: May 13, 2011

(87) PCT Pub. No.: WO2010/057855
PCT Pub. Date: May 27, 2010

(65) Prior Publication Data
US 2011/0218137 A1      Sep. 8, 2011

(30) Foreign Application Priority Data
Nov. 20, 2008   (DE) .......................... 10 2008 043 944

(51) Int. Cl.
C08G 77/46 (2006.01)
C08G 77/04 (2006.01)
C08G 18/06 (2006.01)
C11D 3/20 (2006.01)

(52) U.S. Cl. .............. 528/29; 528/31; 528/44; 516/124; 510/347

(58) Field of Classification Search ........................ None
See application file for complete search history.

(56) References Cited

U.S. PATENT DOCUMENTS

| | | | |
|---|---|---|---|
| 3,383,327 A | 5/1968 | Sullivan | |
| 3,541,127 A * | 11/1970 | Beattie et al. | 556/446 |
| 3,763,021 A | 10/1973 | Householder | |
| 4,839,443 A * | 6/1989 | Akutsu et al. | 525/474 |
| 5,102,953 A * | 4/1992 | Yano et al. | 525/101 |
| 5,380,464 A | 1/1995 | McGee et al. | |
| 5,625,024 A * | 4/1997 | Schlitte et al. | 528/29 |
| 5,952,444 A * | 9/1999 | Ayama | 528/28 |
| 6,187,891 B1 | 2/2001 | Rautschek et al. | |
| 6,297,331 B1 * | 10/2001 | Feldmann-Krane et al. | 525/474 |
| 6,521,084 B1 | 2/2003 | Burger et al. | |
| 6,605,183 B1 | 8/2003 | Rautschek et al. | |
| 6,750,309 B1 * | 6/2004 | Chu et al. | 528/28 |
| 6,790,451 B2 * | 9/2004 | Nakanishi | 424/401 |
| 7,105,581 B2 * | 9/2006 | Burger et al. | 516/124 |
| 2004/0106749 A1 | 6/2004 | Burger et al. | |
| 2008/0200608 A1 | 8/2008 | Burger et al. | |
| 2009/0137446 A1 * | 5/2009 | Rautschek et al. | 510/347 |

FOREIGN PATENT DOCUMENTS

| | | |
|---|---|---|
| DE | 1519987 | 4/1970 |
| DE | 2222998 A1 | 12/1972 |
| DE | 102004052421 A1 | 5/2006 |
| DE | 102005025450 A1 | 12/2006 |
| EP | 0341952 A2 | 5/1989 |
| EP | 1076073 B1 | 6/2000 |
| EP | 1424117 A2 | 11/2003 |

OTHER PUBLICATIONS

English Abstract for DE102004052421, 2006.

* cited by examiner

*Primary Examiner* — Robert Loewe
(74) *Attorney, Agent, or Firm* — Brooks Kushman P.C.

(57) ABSTRACT

Mixtures of silicone resin with an organopolysiloxane copolymer prepared by hydrosilylating a substantially linear polymer containing an isocyanate reactive group with an Si—H containing organopolysiloxane, and reacting this intermediate with a diisocyanate, are useful as long lasting defoamers which are compatible with numerous media.

12 Claims, No Drawings

ANTIFOAMING COMPOSITIONS

CROSS-REFERENCE TO RELATED APPLICATION

This application is the U.S. national phase of PCT Appln. No. PCT/EP2009/065236 filed Nov. 16, 2009 which claims priority to German application DE 10 2008 043 944.4 filed Nov. 20, 2008.

BACKGROUND OF THE INVENTION

1. Field of the Invention

The invention relates to compositions comprising specific polysiloxane copolymers, to processes for preparing them, and also to their use as defoamers, particularly for defoaming aqueous surfactant formulations.

2. Description of the Related Art

In many liquid systems, especially aqueous systems, which include surface-active compounds as desired or else unwanted constituents, it is possible for problems to occur as a result of foaming if these systems are contacted more or less intensively with gaseous substances, such as during the gassing of waste waters, during the intensive stirring of liquids, during distillation, washing or coloring operations or during dispensing processes, for example.

This foam can be controlled by mechanical means or through the addition of defoamers. Siloxane-based defoamers have proven particularly appropriate here. Siloxane-based defoamers are prepared in accordance with DE-B 15 19 987, for example, by heating hydrophilic silica in polydimethylsiloxanes.

Defoamers based on polydimethylsiloxanes have the disadvantage that the compatibility of polydimethylsiloxanes with the majority of surfactant systems, such as wetting agents or liquid detergents, for example, is poor and the polydimethylsiloxanes tend to be deposited, which is highly undesirable.

These antifoam materials may be combined with polyethersiloxanes, as described in EP-A 341952, DE 102004052421, and DE 102005025450, for example. The polyethersiloxanes serve to improve the activity of the siloxane-based defoamers, which are considered unavoidable. The defoamer formulations, however, are likewise incompatible with aqueous surfactant systems and therefore are not suitable for application in storage-stable aqueous formulations, such as liquid detergents and wetting agents, for example.

SUMMARY OF THE INVENTION

The invention provides compositions comprising
(A) polysiloxane copolymers preparable by reacting
in a 1st step
organopolysiloxanes (1) which have per molecule at least one Si-bonded hydrogen atom, preferably at least two Si-bonded hydrogen atoms, with largely linear oligomeric or polymeric compounds (2) of the general formula

(I), where $R^1$ is a monovalent, optionally substituted hydrocarbon radical to which Si—H groups can be added in a hydrosilylation reaction, preferably a hydrocarbon radical containing aliphatic multiple C—C bond,
A is a divalent, polar organic radical selected from the group of —O—, —C(O)—O—, —O—C(O)—, —O—C(O)—O—, —C(O)—NH—, —NH—C(O)—, urethane radical and urea radical, preferably an oxygen atom —O—,
$A^1$ is a divalent, polar organic radical selected from the group of —O—, —NH— and —NR′, where R′ is a monovalent hydrocarbon radical having 1 to 18 carbon atoms, preferably an oxygen atom —O—,
n is an integer from 1 to 20, preferably 1 to 4, more preferably 2 or 3, and
m is an integer, preferably 5 to 50,
with the proviso that the m units ($A$-$C_nH_{2n}$) may be identical or different,
and reacting
in a 2nd step
the resultant intermediates (4), containing H-$A^1$ groups, with organic compounds (5) which have per molecule at least two isocyanate groups, and also, optionally, further compounds (7),
(B) organopolysiloxane resins comprising units of the formula

(VI), in which
$R^8$ may be identical or different and denotes hydrogen atom or a monovalent, optionally substituted, SiC-bonded hydrocarbon radical,
$R^9$ may be identical or different and denotes a hydrogen atom or a monovalent, optionally substituted hydrocarbon radical,
g is 0, 1, 2 or 3, and
h is 0, 1, 2 or 3,
with the proviso that the sum $g+h \leq 3$ and in less than 50% of all of the units of the formula (VI) in the organopolysiloxane resin the sum $g+h$ is 2,
optionally
(C) polyether-modified siloxanes different from (A),
optionally
(D) organic compounds,
optionally
(E) water, and
optionally
(F) additives,
with the proviso that said compositions do not comprise polyorganosiloxanes in which more than 90% of the units are difunctional units of the formula $SiR''_2O_{2/2}$ where R″ is a hydrocarbon radical.

The compositions of the invention are free from polyorganosiloxanes in which more than 90%, preferably more than 50%, of the units are difunctional units of the formula $SiR''_2O_{2/2}$ where R″ is a hydrocarbon radical, such as, for example, substantially linear polydimethylsiloxanes or polymethylphenylsiloxanes.

The compositions of the invention are preferably free from highly disperse silica, and more preferably are free from inorganic fillers.

The compositions are preferably compositions composed of
(A) polysiloxane copolymers preparable by reacting
in a 1st step
organopolysiloxanes (1) which have per molecule at least one Si-bonded hydrogen atom, preferably at least two Si-bonded hydrogen atoms, with largely linear oligomeric or polymeric compounds (2) of the general formula

(I), where R¹ is a monovalent, optionally substituted hydrocarbon radical to which Si—H groups can be added in a hydrosilylation reaction, preferably a hydrocarbon radical containing aliphatic multiple C—C bond, A is a divalent, polar organic radical selected from the group of —O—, —C(O)—O—, —O—C(O)—, —O—C(O)—O—, —C(O)—NH—, —NH—C(O)—, urethane radical and urea radical, preferably an oxygen atom —O—, A¹ is a divalent, polar organic radical selected from the group of —O—, —NH— and —NR', where R' is a monovalent hydrocarbon radical having 1 to 18 carbon atoms, preferably an oxygen atom —O—, n is an integer from 1 to 20, preferably 1 to 4, more preferably 2 or 3, and m is an integer, preferably 5 to 50, with the proviso that the m units (A-$C_n$—$H_{2n}$) may be identical or different, and reacting in a 2nd step the resultant intermediates (4), containing H-A¹ groups, with organic compounds (5) which have per molecule at least two isocyanate groups, and also, optionally, further compounds (7), (B) organopolysiloxane resins comprising units of the formula

in which

R⁸ may be identical or different and denotes hydrogen atom or a monovalent, optionally substituted, SiC-bonded hydrocarbon radical, R⁹ may be identical or different and denotes a hydrogen atom or a monovalent, optionally substituted hydrocarbon radical, g is 0, 1, 2 or 3, and h is 0, 1, 2 or 3, with the proviso that the sum g+h≦3 and in less than 50% of all of the units of the formula (VI) in the organopolysiloxane resin the sum g+h is 2, optionally (C) polyether-modified siloxanes different from (A), optionally (D) organic compounds, optionally (E) water, and optionally (F) additives.

The polysiloxane copolymers (A) used in the compositions of the invention preferably possess a viscosity of 1000 to 100,000,000 mm²/s, more preferably 1000 to 10,000,000 mm²/s, in each case at 25° C.

Surprisingly it has been found that the compositions of the invention based on the polysiloxane copolymers (A) not only are very highly compatible with aqueous surfactant formulations, but also have outstanding activity even without conventional defoamers based on substantially linear polyorganosiloxanes, more particularly polydimethylsiloxanes, and without silica.

The compositions contain preferably 10% to 98% by weight, more preferably 30% to 90% by weight, of polysiloxane copolymers (A).

The polysiloxane copolymers (A) used in accordance with the invention are obtained as follows:

In the first process step the organopolysiloxanes (1) used are preferably linear, cyclic or branched organopolysiloxanes comprising units of the general formula

where

R may be identical or different and denotes a monovalent, optionally substituted hydrocarbon radical having 1 to 18 carbon atoms per radical, e is 0, 1, 2 or 3, and f is 0, 1 or 2, with the proviso that the sum e+f is 0, 1, 2 or 3 and per molecule there is at least one Si-bonded hydrogen atom, preferably at least 2 Si-bonded hydrogen atoms.

As organopolysiloxanes (1) it is preferred to use those of the general formula

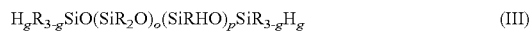

where

R is as defined for it above, g is 0, 1 or 2, o is 0 or an integer from 1 to 1500, and p is 0 or an integer from 1 to 200, with the proviso that per molecule there is at least one Si-bonded hydrogen atom, preferably at least two Si-bonded hydrogen atoms.

For the purposes of this invention formula (III) is to be understood such that o units —(SiR₂O)— and p units —(SiRHO)— can be distributed in any desired way in the organopolysiloxane molecule.

With particular preference in the formula (III) g is 0, o is 20 to 100, and p is 3 to 10, and organopolysiloxanes (1) used are copolymers comprising hydrogenalkylsiloxy and dialkylsiloxy units, more particularly copolymers comprising hydrogenmethylsiloxy and dimethylsiloxy units.

The organopolysiloxanes (1) preferably possess an average viscosity of 10 to 1000 mm²/s, more preferably 50 to 1000 mm²/s, and most preferably 60 to 600 mm²/s, in each case at 25° C.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as the cyclopentyl, cyclohexyl, cycloheptyl, and methylcyclohexyl radicals; aryl radicals such as the phenyl, naphthyl, anthryl, and phenanthryl radicals; alkaryl radicals such as the o-, m-, p-tolyl radicals, xylyl radicals, and ethylphenyl radicals; and aralkyl radicals such as the benzyl radical, and the α- and the β-phenylethyl radical.

Examples of substituted radicals R are haloalkyl radicals such as the 3,3,3-trifluoro-n-propyl radical, the 2,2,2,2',2',2'-hexafluoroisopropyl radical, the heptafluoroisopropyl radical, and haloaryl radicals, such as the o-, m-, and p-chlorophenyl radicals.

The radical R is preferably a monovalent hydrocarbon radical having 1 to 6 carbon atoms, the methyl radical being particularly preferred.

Examples of radicals R apply fully to radicals R'.

Examples of radicals R¹ are alkenyl radicals such as the vinyl, 5-hexenyl, cyclohexenyl, 1-propenyl, allyl, 3-butenyl, and 4-pentenyl radical, and alkynyl radicals such as the ethynyl, propargyl, and 1-propynyl radical. Radical R¹ preferably comprises alkenyl radicals, more preferably co-alkenyl radicals, and in particular, the allyl radical.

Preferred oligomeric or polymeric compounds (2) are polyethers of the general formula $$H_2C=CH-R^2-(OC_nH_{2n})_m-OH \quad (IV),$$

where $R^2$ is a divalent hydrocarbon radical having 1 to 10 carbon atoms, preferably a radical of the formula $-CH_2-$, $-CH(CH_3)-$ or $-C(CH_3)_2-$, and n and m have one of the definitions specified for them above.

Particularly preferred examples of polyethers (2) are those of the general formula $$H_2C=CH-R^2-(OCH_2CH_2)_a[OCH_2CH(CH_3)]_b-OH \quad (IV'),$$

where $R^2$ is as defined above and a and b are each independently of one another 0 or an integer, the sum a+b being from 1 to 200, preferably 5 to 50.

Further examples of oligomeric or polymeric compounds (2) are unsaturated polyesters, such as $H_2C=R^2-[O(O)CC_nH_{2n}]_m-OH$, unsaturated polycarbonates, such as $H_2C=CH-R^2-[OC(O)OC_nH_{2n}]_m-OH$, and unsaturated polyamides, such as $H_2C=CH-R^2-[NHC(O)C_nH_{2n}]_m-NH_2$, where $R^2$, n, and m have one of the definitions indicated above.

The water content of the compounds (1) and (2) used for preparing the polysiloxane copolymers (A) is preferably lower than 2000 ppm by weight, more preferably lower than 1500 ppm by weight, and most preferably lower than 1000 ppm by weight, based in each case on the total weight of compounds (1) and (2). The water content here refers to room temperature (20° C.) and the pressure of the surrounding atmosphere (1020 hPa).

In the first process step the compounds (2) are used preferably in amounts of 1.0 to 4.0 mol, more preferably 1.3 to 2.5 mol, of radical $R^1$, which is preferably a radical with an aliphatic multiple C—C bond, more preferably an co-alkenyl radical, per gram atom of Si-bonded hydrogen in the organopolysiloxane (1).

In the first process step it is preferred to use catalysts (3) which promote the addition of Si-bonded hydrogen to aliphatic multiple bond. As catalysts (3) it is also possible in the process of the invention to employ the same catalysts which are useful to promote the addition of Si-bonded hydrogen to an aliphatic multiple bond. The catalysts are preferably a metal from the group of the platinum metals, or a compound or a complex from the group of the platinum metals. Examples of such catalysts are metallic and finely divided platinum, which may be present on supports such as silica, alumina or activated carbon, or compounds or complexes of platinum, such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinyl siloxane complexes, such as platinum-1,3-divinyl-1,1,3,3-tetramethyldisiloxane complexes with or without detectable inorganically bonded halogen present, bis(γ-picoline)platinum dichloride, trimethylenedipyridine-platinum dichloride, dicyclopentadieneplatinum dichloride, dimethyl sulfoxide-ethylene-platinum(II) dichloride, cyclooctadiene-platinum dichloride, norbornadiene-platinum dichloride, γ-picoline-platinum dichloride, cyclopentadiene-platinum dichloride, and also reaction products of platinum tetrachloride with olefin and primary amine or secondary amine or both primary and secondary amine, such as the reaction product of platinum tetrachloride, in solution in 1-octene, with sec-butylamine, or ammonium-platinum complexes.

If in the first process step catalyst (3) is used, the amounts involved are preferably 1 to 50 ppm by weight (parts by weight per million parts by weight), more preferably 2 to 20 ppm by weight, calculated in each case as elemental platinum and based on the total weight of the organopolysiloxanes (1) and compounds (2).

The first process step is carried out preferably under the pressure of the surrounding atmosphere, i.e., for instance, 900 to 1100 hPa (abs.). The first process step, moreover, is preferably carried out at a temperature of 60° C. to 140° C., more preferably 80° C. to 120° C.

In the second process step organic compounds (5) which contain at least two isocyanate groups per molecule, preferably of those of the general formula $$O=C=N-R^3-N=C=O \quad (V),$$

where $R^3$ is a divalent hydrocarbon radical having 4 to 40 carbon atoms per radical are used.

Examples of organic compounds (5) are hexamethylene 1,6-diisocyanate, isophorone diisocyanate, tolylene 2,4-diisocyanate, tolylene 2,6-diisocyanate, phenylene 1,3-diisocyanate, 4,4'-methylenebis(cyclohexyl isocyanate), 4,4'-methylenebis(phenyl isocyanate), and dimethylphenyl diisocyanate.

For preparing the inventively employed component (A), organic compounds (5) are used in the second process step preferably in amounts of 0.1 to 0.9 mol, more preferably 0.2 to 0.7 mol, of isocyanate groups per mole of $H-A^1$ group in the intermediate (4).

For the reaction in the second step it is preferred to use condensation catalysts (6), such as di-n-butyltin dilaurate, tin(II) octoate, dibutyltin diacetate, potassium octoate, bismuth carboxylate, zinc octoate, zirconium carboxylates or tertiary amines, such as dimethylcyclohexylamine, dimethylaminopropyldipropanol-amine, pentamethyldipropylenetriamine, N-methyl-imidazole or N-ethylmorpholine.

A preferred polysiloxane copolymer (A) is obtained by reacting, in the first process step, a methyl-terminated hydrogen-functional polysiloxane (1) pendently containing Si-bonded hydrogen atoms with an excess of polyether (2) of the formula (IV), and in the second process step reacting the intermediate (4), a silicone polyether with comb structure, with a diisocyanate (5) of the formula (V), with urethane groups being introduced into the polysiloxane copolymer. Free polyether from the 1st step is also bound by urethane formation in this reaction.

The urethane groups in the inventively employed hydrophilic polysiloxane copolymers (A) are able to act as donors and acceptors in the context of the formation of hydrogen bonds.

In the second step for preparing the inventively employed siloxane copolymers (A) it is possible, in addition to the organic compounds (5), to use further compounds (7) which are reactive toward isocyanate groups. Preferred examples of further compounds (7) are those selected from the group of the formulae $$R^4-(A-C_nH_{2n})_m-A^1-H \quad (VII),$$

$$HO-R^5-NR^4-R^5-OH \quad (VIII),$$

$$HO-R^5-NR^4_2 \quad (IX),$$

$$HO-R^6(NR^4_2)_2 \quad (X),$$

$$HO-R^7(NR^4_2)_3 \quad (XI),$$

$$(HO)_2R^6-NR^4_2 \quad (XII), \text{ and}$$

$$HNR^4_2 \quad (XIII),$$

where $R^4$ is a hydrogen atom or a radical R, which may contain one or more nitrogen atoms, $R^5$ may be identical or different and is a divalent hydrocarbon radical having 1 to 10 carbon atoms per radical, $R^6$ is a trivalent organic radical having 1 to 100 carbon atoms per radical, preferably a trivalent hydrocarbon radical having 1 to 100 carbon atoms, and containing one or more oxygen atoms, $R^7$ is a tetravalent organic radical having 1 to 100 carbon atoms per radical, preferably a tetravalent hydrocarbon radical having 1 to 100 carbon atoms, and containing one or more oxygen atoms, and $A^1$, n, and m have the definitions specified for them above.

Examples of compounds of the formula (VII) are methylpolyethylene oxide, butylpolyethylene oxide, methylpolyethylene oxide/polypropylene oxide, and methylpolypropylene oxide.

Examples of compounds of the formula (VIII) are N-methyldiethanolamine, N-methyldipropanolamine, dimethylaminopropyldipropanolamine, N-dodecyldiethanol-amine, and N-stearyldipropanolamine.

Examples of compounds of the formula (IX) are N,N-dimethylethanolamine, N,N-diethylpropanolamine, N,N-dimethylaminopropylmethylethanolamine, and dimethyl-2-(2-aminoethoxy)ethanol.

Examples of compounds of the formula (X) are 1,5-bis(dimethylamino)pentan-3-ol, 1,5-bis(methylamino)-pentan-3-ol, 1,7-bis(dimethylamino)heptan-4-ol, and N,N-bis(3-dimethylaminopropyl)-N-isopropanolamine.

Examples of compounds of the formula (XI) are 2,4,6-tris(dimethylaminomethyl)phenol, 1,1,1-tris(dimethyl-aminomethyl)methanol, and 2,4,6-tris(dimethylamino-methyl)cyclohexanol.

Examples of compounds of the formula (XII) are N,N-bis(dimethylaminopropyl)-3-aminopropane-1,2-diol, N,N-bis(dimethylaminopropyl)-2-aminopropane-1,3-diol, N,N-bis(3-dimethylaminopropyl)carbamino acid monoglyceride.

Examples of compounds of the formula (XIII) are dibutylamine, octylamine, benzylamine, 3-(cyclohexylamino)propylamine, 2-(diethylamino)ethylamine, dipropylenetriamine, isophoronediamine, dimethylaminopropylmethylamine, aminopropylmorpholine, N,N-bis-(dimethylaminopropyl) amine, and dimethylaminopropyl-amine.

Compounds of the formula (VIII) to (XIII) afford an opportunity to incorporate protonatable nitrogen in the polysiloxane copolymer (A).

If compounds (7) are used for preparing the inventively employed component (A), they are preferably compounds of the formula (VII).

For preparing the inventively employed component (A) it is preferred to use compounds (7).

Compounds of the formula (VII) are preferably used in the second process step in amounts of 0 to 2 mol, more preferably 0 to 1 mol, of H-$A^1$ group per mole of H-$A^1$ group in compound (2).

Compounds of the formula (VIII) are preferably used in the second process step in amounts of 0 to 2 mol, more preferably 0 to 1 mol, of HO group per mole of H-$A^1$ group in compound (2).

Compounds of the formula (IX) are preferably used in the second process step in amounts of 0 to 2 mol, more preferably 0 to 1 mol, of HO group per mole of H-$A^1$ group in compound (2).

Compounds of the formula (X) are preferably used in the second process step in amounts of 0 to 2 mol, more preferably 0 to 1 mol, of HO group per mole of H-$A^1$ group in compound (2).

Compounds of the formula (XI) are preferably used in the second process step in amounts of 0 to 2 mol, more preferably 0 to 1 mol, of HO group per mole of H-$A^1$ group in compound (2).

Compounds of the formula (XII) are preferably used in the second process step in amounts of 0 to 2 mol, more preferably 0 to 1 mol, of HO group per mole of H-$A^1$ group in compound (2).

Compounds of the formula (XIII) are preferably used in the second process step in amounts of 0 to 2 mol, more preferably 0 to 1 mol, of HN group per mole of H-$A^1$ group in compound (2).

When compounds (7) are used, as well, polyisocyanate (5) is preferably employed in a deficit amount, in order to ensure that the isocyanate groups, which are considered a hazard to health, are safely consumed by reaction. In the second process step, therefore, organic compounds (5) are used preferably in amounts of 0.1 to 0.9 mol, more preferably 0.2 to 0.7 mol, of isocyanate group per mole of the sum of isocyanato-reactive functions from the sum of intermediate (4) and compounds (7).

The second process step is preferably carried out under the pressure of the surrounding atmosphere, i.e., approximately at between 900 and 1100 hPa (abs.) and preferably at a temperature of 40° C. to 160° C., more preferably 80° C. to 140° C.

In order to lower the product viscosities, which are in some cases very high, in the preparation of the inventively employed polysiloxane copolymers (A), it is possible, if desired, to add substances (D) of low viscosity, such as alcohols or ethers, more particularly those having a boiling point of greater than 100° C. under the pressure of the surrounding atmosphere, in other words at 900 to 100 hPa. Examples of such are ethanol, isopropanol, and n-butanol, and also preferably 2-butoxyethanol, diethylene glycol monobutyl ether, triethylene glycol monohexyl ether, methyl ethers of dipropylene glycol, tetraethylene glycol monohexyl ether, hexaethylene glycol monooctyl ether, tetrahydrofuran, diethylene glycol diethyl ether, and dimethoxyethane, with tetraethylene glycol monohexyl ether being particularly preferred. Additionally, the addition of polyether-modified siloxanes (C), which may be obtained in general by hydrosilylation of unsaturated polyethers with hydrogensiloxanes, is suitable for reducing the viscosity. Preferred amounts added in the case of very viscous products are up to 50% by weight, more preferably up to 30% by weight, based on the inventively employed polysiloxane copolymers (A). Additions of this kind have the advantage, furthermore, that the resultant products are more readily dispersible in water than are the pure polysiloxane copolymers.

The inventively employed component (B) preferably comprises silicone resins comprising units of the formula (VI) in which in 0 to 30%, preferably in 0 to 5%, of the units in the resin the sum g+h is 2.

The radicals $R^8$ are preferably alkyl radicals having 1 to 4 carbon atoms, or the phenyl radical, and most preferably the methyl radical.

The radicals $R^9$ are preferably alkyl radicals having 1 to 4 carbon atoms, more preferably methyl or ethyl radicals, and most preferably the ethyl radical.

With particular preference component (B) comprises organopolysiloxane resins which are composed substantially of $R^8_3SiO_{1/2}$ (M) and $SiO_{4/2}$ (Q) units where $R^8$ is as defined above; these resins are also referred to as MQ resins. The molar ratio of M to Q units is situated preferably in the range from 0.5 to 2.0, more preferably in the range from 0.6 to 1.0. These silicone resins may further comprise up to 10% by weight of free hydroxyl or alkoxy groups. $R^8$ in this case is preferably a methyl radical.

The organopolysiloxane resins (B) at 25° C. preferably have a viscosity of more than 1000 m$^2$/s or are solids. The weight-average molecular weight determined by gel permeation chromatography (relative to a polystyrene standard) for these resins is preferably 200 to 200,000 g/mol, more particularly 1000 to 20,000 g/mol.

The inventively employed organopolysiloxane resins (B) are preferably soluble to at least 100 g/l in benzene at a temperature of 25° C. and a pressure of 101.325 kPa.

Components (B) are commercially available products and/or can be prepared by methods commonplace in silicon chemistry.

Siloxane resins (B) are preferably used in the compositions of the invention in amounts of 0.1% to 20% by weight, more preferably 1% to 10% by weight, based in each case on the total weight of the composition.

The compositions of the invention may further comprise polyether-polysiloxane copolymers (C), which are different from (A).

Examples of optionally employed component (C) are the compounds described in DE-B2 22 22 998, columns 3 and 4, lines 38-43, EP-A 1 424 117, paragraphs [0072] and [0073], U.S. Pat. No. 6,521,084, column 4 lines 35-44, U.S. Pat. No. 6,187,891, columns 9/10, table 1, and EP-B1 076 073, page 3, which are incorporated herein by reference. In preparing the formulations of the invention, the polyether-polysiloxane copolymers (C) can be blended with the inventively employed polysiloxane copolymers (A).

The polyether-polysiloxane copolymers (C) are preferably used in the compositions of the invention in amounts of 0% to 60% by weight, more preferably 0% to 40% by weight, based in each case on the total weight of the composition. In one preferred variant, the compositions of the invention contain 20% to 40% by weight of component (C).

Further to components (A), (B), and, optionally, (C), the compositions of the invention may comprise all other substances which have also been used to date in defoamer formulations, such as, for example, organic compounds (D).

The optionally employed organic compounds (D) are preferably free from silicon atoms. The optionally employed component (D) more preferably comprises organic compounds having a boiling point of greater than 100° C. under the pressure of the surrounding atmosphere, in other words at 900 to 1100 hPa, and yet more preferably compounds which cannot be distilled without decomposition, most preferably compounds selected from mineral oils, natural oils, isoparaffins, polyisobutylenes, residues from the oxo process for alcohol synthesis, esters of low molecular mass synthetic carboxylic acids, fatty acid esters such as octyl stearate and dodecyl palmitate, fatty alcohols, ethers of low molecular mass alcohols, phthalates, glycols, polyethylene glycols, polypropylene glycols, polyethylene glycol-polypropylene glycol copolymers, polyethylene glycol and/or polypropylene glycol ethers of linear or branched alcohols having 3-30 carbon atoms, polyethylene glycol and/or polypropylene glycol esters of carboxylic acids having 3-30 carbon atoms, esters of phosphoric acid, and waxes.

More preferably the optionally employed component (D) comprises esters such as 2,2,4-trimethyl-3,3-pentanediol diisobutyrates, glycols such as, for example, 1,2-propanediol, glycol ethers, and polyglycols such as polyethylene glycols, polypropylene glycols, and polyethylene glycol-polypropylene glycol copolymers, examples being the polyethers used in excess in the preparation of component (A).

The components (C) and (D), employed optionally in the compositions of the invention, may on the one hand serve to establish a comfortably manageable viscosity, and on the other hand may be tailored specifically to a particular application. Thus, for example, through the specific selection of the components (C) and (D), the defoamer formulation of the invention can be tailored to the surfactant system in which defoaming is to take place.

In the compositions of the invention, the organic compounds (D) are preferably used in amounts of 0% to 60% by weight, more preferably 5% to 40% by weight, based in each case on the total weight of the composition. The compositions of the invention preferably comprise component (D).

The formulations of the invention may comprise water (E). Examples of water (E) are natural waters such as rainwater, ground water, spring water, river water, and sea water, for example, chemical waters, such as fully demineralized water, distilled or (multiply) redistilled water, for example, waters for medical or pharmaceutical use, such as purified water (aqua purificata; Pharm. Eur. 3), aqua deionisata, aqua destillata, aqua bidestillata, aqua ad injectionam or aqua conservata, for example, potable water in accordance with the German potable water ordinance, and mineral waters.

Water (E) is preferably used in the compositions of the invention in amounts of 0% to 60% by weight, more preferably 0% to 10% by weight, based in each case on the total weight of the composition. The compositions of the invention preferably do not contain component (E).

The additives (F) employed optionally are all additives useful in organopolysiloxane compositions. The additives (F) are preferably additives selected from organic, thickening polymers, preservatives, dyes, and fragrances.

If additives (F) are used in the compositions of the invention, the amounts involved are preferably 0.01% to 5.0% by weight, more preferably 0.05% to 2.0% by weight, based in each case on the total weight of the composition. The compositions of the invention preferably do not contain component (F).

The compositions of the invention are composed more preferably of
(A) 10% to 98% by weight of polysiloxane copolymers,
(B) 0.1% to 20% by weight of organopolysiloxane resins,
(C) 0% to 60% by weight of polyether-modified siloxanes which are different from (A),
(D) 0% to 60% by weight of organic silicon-free compounds,
(E) 0% to 60% by weight of water, and
(F) 0% to 5.0% by weight of additives,
based in each case on the total weight of the compositions.

The compositions of the invention are composed most preferably of
(A) 30% to 90% by weight of polysiloxane copolymers,
(B) 1% to 10% by weight of organopolysiloxane resins,
(C) 0% to 40% by weight of polyether-modified siloxanes which are different from (A),
(D) 5% to 40% by weight of organic silicon-free compounds,
(E) 0% to 10% by weight of water, and
(F) 0% to 2.0% by weight of additives,
based in each case on the total weight of the compositions.

The compositions of the invention are preferably viscous, clear to opaque, colorless to brownish liquids.

The compositions of the invention preferably have a viscosity of preferably 100 to 2,000,000 mm$^2$/s, more preferably 500 to 50,000 mm$^2$/s, more particularly of and most preferably 1000 to 20,000 mm$^2$/s, in each case at 25° C.

The compositions of the invention may be solutions or dispersions.

The compositions of the invention may be prepared by known methods, such as by mixing of all of the components, for example, such as by simple stirring with static mixers, for example, or else with employment of high shearing forces in colloid mills, dissolvers, and rotor-stator homogenizers.

The present invention further provides liquid wetting, detergent, and cleaning materials comprising the compositions of the invention.

The compositions of the invention can be used wherever compositions based on organosilicon compounds have also been used to date. More particularly they can be employed as defoamers.

The present invention further provides a method for defoaming and/or foam prevention in media, characterized in that the composition of the invention is mixed with the medium.

The composition of the invention may be added directly to the foaming media, in solution in suitable solvents, such as toluene, xylene, methyl ethyl ketone or tert-butanol, or as a powder or as an emulsion. The amount needed in order to obtain the desired defoamer effect is dependent, for example, on the nature of the medium, on the temperature, and on the turbulence that occurs.

The compositions of the invention are preferably mixed directly with concentrated liquid surfactant formulations. In this way, the formation of foam by the liquor prepared from such formulations by dilution is prevented.

The compositions of the invention are added preferably in amounts of 0.1 ppm by weight to 1% by weight, more preferably in amounts of 1 to 100 ppm by weight, to the ready-to-use foaming medium. In concentrated surfactant formulations, the compositions of the invention may be present at 0.1% to 20% by weight, more preferably at 0.5% to 5% by weight.

The method of the invention is preferably carried out at temperatures of −10° C. to +150° C., more preferably 5° C. to 100° C., and at the pressure of the surrounding atmosphere, in other words about 900 to 1100 hPa. The method of the invention may also be carried out at higher or lower pressures, such as, for instance, at 3000 to 4000 hPa or 1 to 10 hPa.

The defoamer compositions of the invention can be employed wherever disruptive foam is to be suppressed. This is the case, for example, in nonaqueous systems such as tar distillation or petroleum processing. More particularly the defoamer compositions of the invention are suitable for controlling foam in aqueous surfactant systems, the application in detergents and cleaning materials, the control of foam in wastewater plants, in textile dyeing operations, in the scrubbing of natural gas, and in polymer dispersions, and can be used for defoaming aqueous media arising in pulp production.

The compositions of the invention have the advantage that they can be readily managed as defoamers, can be mixed with concentrated surfactant formulations, and that they are notable for a high and long-lasting activity in a wide variety of different media when added in small amounts. From the standpoints both of economics and of ecology, this is extraordinarily advantageous.

The method of the invention has the advantage that it is simple to implement and highly economic.

In the examples below, all figures for parts and percentages, unless otherwise indicated, are given by weight. Unless otherwise indicated, the examples below are carried out under the pressure of the surrounding atmosphere, in other words at about 1000 hPa, and at room temperature, in other words about 20° C., or at a temperature which comes about without additional heating or cooling when the reactants are combined at room temperature. All of the viscosity figures quoted in the examples relate to a temperature of 25° C.

Compatibility Tests

To test the activity of the defoamers, 2% of each of the defoamer formulations are added to various liquid surfactant formulations. After 14 days, the compatibility is assessed visually on the following scale: +=compatible, o=low level of deposition, −=incompatible.

Products which were compatible or exhibited only low levels of deposition were tested for their activity.

Defoamer Activity Tests

To test for activity, a 0.1% strength by weight solution of the defoamer-containing surfactant formulation was pumped in circulation in a heated glass beaker, with the pumped surfactant solution falling from a height of 10 cm onto the surface of the surfactant solution. The foam rise was observed continuously over a period of 60 minutes. The temperature and pumping velocity are given in each of the individual examples.

Surfactant Formulations

Formulation 1: An aqueous formulation containing 10% by weight of dodecylbenzenesulfonic acid (available under the name "Marlon AS3-Saure" from Sasol Germany GmbH, Germany), 7% by weight of triethanolamine, and 10% by weight of ethoxylated tridecyl alcohol with 10 ethylene glycol units (available under the name "Lutensol TO 109" from BASF SE, Germany).

Formulation 2: A mixture of fatty alcohol ethoxylates having a density of 1.0108 and an active ingredient content of 40% by weight.

Formulation 3: A mixture of ionic surfactants based on fatty acid alkanolamides, having a density of 1.0059 and an active ingredient content of 36% by weight.

Formulation 4: Mixture of alkanesulfonates and fatty alcohol ethoxylates, having a density of 1.0131 and an active ingredient content of 18% by weight.

Preparation of Component (A)

Preparation of the Polysiloxane Copolymer (Polymer A1):

67 g of a siloxane terminated with methyl groups and comprising dimethylsiloxy units and hydrogenmethylsiloxy units, with an active hydrogen content of 0.133% and a viscosity of 72 mm$^2$/s (25° C.), are mixed with vigorous stirring with 408 g of an allyl polyether (560 ppm H$_2$O content) with a PO/EO ratio of 4.0 and an iodine number of 11.2 and the mixture is heated to 100° C. Hydrosilylation is initiated by addition of 0.5 ml of a 2% strength solution of hexachloroplatinic acid in isopropanol, and is apparent in a weakly exothermic reaction. The reaction mixture is held at 100 to 110° C. until a clear copolymer is obtained and active hydrogen is no longer detectable. The intermediate has a viscosity of 870 mm$^2$/s (25° C.)

Heating is continued to 130° C., and traces of water are removed at 1 hPa. Thereafter, 7 g of hexamethylene diisocyanate are metered in and the system is homogenized for 20 minutes. The isocyanate reaction is initiated with one drop of dibutyltin laurate (DBTL). After 2 hours, the NCO content has fallen below the detection limit (IR: 20 ppm), and so 120 g of a surfactant (available commercially under the name Emulan® HE 50 from BASF SE, D-Ludwigshafen) are metered in. The 80% strength copolymer solution, after cooling to 25° C., has a viscosity of 2100 mm$^2$/s and a urethane content of 0.139 meq/g.

Preparation of the Polysiloxane Copolymer (Polymer A2):

The preparation takes place in accordance with the procedure described for polymer A1, with the modification that, instead of the surfactant (Emulan HE 50), 120 g of the intermediate having the viscosity of 870 mm²/s were used for diluting the high-viscosity siloxane. The viscosity was 4090 mm²/s.

Preparation of the Polysiloxane Copolymer (Polymer A3):

The preparation takes place in accordance with the procedure described for polymer A1, with the modification that no surfactant (Emulan HE 50) was used. The viscosity was more than 100,000 mm²/s (25° C., no shearing).

As component (B), use was made of a benzene-soluble silicone resin which is solid at room temperature and is composed of (according to $^{29}$Si-NMR and IR analysis) 40 mol % of $CH_3SiO_{1/2}$ units, 50 mol % of $SiO_{4/2}$ units, 8 mol % of $C_2H_5OSiO_{3/2}$ units, and 2 mol % of $HOSiO_{3/2}$ units, and has a weight-average molar mass of 7900 g/mol (based on polystyrene standard).

As component (C), use was made of the intermediate having the viscosity of 870 mm²/s that was obtained in the preparation of the polymer A1.

As component (D), use was made of the following:

D1: A hydrocarbon mixture having a boiling range of 235-270° C. (available commercially under the name Exxsol D 100 S from Staub & Co, D-Nuremberg);

D2: A polypropylene glycol having a viscosity of about 100 mm²/s (available under the name PPG 400 from F.B. Silbermann GmbH & Co KG, D-Gablingen);

D3: A polypropylene glycol having a viscosity of about 440 mm²/s (available under the name Pluriol P 2000 from BASF SE, D-Ludwigshafen);

D4: 1,2-Propanediol (available from Sigma-Aldrich Chemie GmbH, D-Steinheim);

D5: 2,2,4-Trimethyl-3,3-pentanediol diisobutyrates (available under the name Eastman TXIB from Sigma-Aldrich Chemie GmbH, D-Steinheim).

EXAMPLES 1 TO 8 (E1 TO E8)

The individual defoamer formulations 1 to 8 were prepared by simple mixing of all of the components indicated in table 1, using a dissolver disk.

The compositions obtained are clear, viscous, slightly yellowish liquids having the viscosities indicated in table 1.

TABLE 1

| Example | Component (A) | Component (B) | Component (C) | Component (D) | Viscosity in mm²/s |
|---|---|---|---|---|---|
| E1 | 90% A1 | 5% B | — | 5% D1 | 3140 |
| E2 | 80% A1 | 10% B | — | 10% D1 | 2750 |
| E3 | 95% A2 | 2.5% B | — | 2.5% D1 | 751 |
| E4 | 45% A3 | 2.5% B | — | 2.5% D1, 50% D3 | 2200 |
| E5 | 45% A3 | 2.5% B | — | 2.5% D1, 50% D2 | 918 |
| E6 | 45% A3 | 2.5% B | — | 2.5% D1, 50% D4 | 258 |
| E7 | 45% A3 | 2.5% B | 50% C | 2.5% D1 | 2440 |
| E8 | 45% A3 | 2.5% B | — | 2.5% D1, 50% D5 | 348 |

The defoamer effect of the formulations thus prepared is tested on the basis of surfactant formulations, and the results are summarized in tables 2 to 5.

COMPARATIVE EXAMPLES C1 AND C2

The individual defoamer formulations were prepared by simple mixing of all of the components specified below, using a dissolver disk.

C1: 42.5 parts of a linear polyethersiloxane of formula $M_2D_{70}D^G_5$: $G=C_3H_6O(PO)_{25}(EO)_{25}H$), 2.5 parts of silicone resin B, 2.5 parts of components D1, 2.5 parts of a fumed hydrophobized silica having a BET surface area of 200 m²/g and a carbon content of 2.8%, available under the trade name HDK® H2000 from Wacker Chemie AG, D-Munich, and 50 parts of D2 are mixed homogeneously.

C2: A defoamer corresponding to example C11 of DE102005025450.

The defoamer effect of the formulations thus prepared is tested on the basis of surfactant formulations, and the results are summarized in tables 2 to 5.

TABLE 2

Results of testing of the defoamers in surfactant formulation 1

| Example | Compatibility | Foam height after 60 min at 50° C. and 85 l/h | Foam height after 60 min at 80° C. and 85 l/h |
|---|---|---|---|
| None | + | 80 mm | 60 mm |
| E1 | + | 60 mm | 53 mm |
| E2 | + | 56 mm | 50 mm |
| E4 | + | 56 mm | 43 mm |
| E7 | + | 56 mm | 38 mm |
| C1 | + | 75 mm | 55 mm |
| C2 | — | — | — |

TABLE 3

Results of testing of the defoamers in surfactant formulation 2

| Example | Compatibility | Maximum foam height at 50° C. and 80 l/h |
|---|---|---|
| None | + | 55 mm |
| E1 | + | 20 mm |
| E2 | ○ | 20 mm |
| E3 | ○ | 33 mm |
| E5 | ○ | 33 mm |
| E6 | ○ | 33 mm |
| E7 | ○ | 18 mm |
| C1 | ○ | 54 mm |
| C2 | — | — |

TABLE 4

Results of testing of the defoamers in surfactant formulation 3

| Example | Compatibility | Maximum foam height at 50° C. and 80 l/h |
|---|---|---|
| None | + | 55 mm |
| E1 | ○ | 41 mm |
| E2 | ○ | 15 mm |
| E3 | ○ | 30 mm |
| E4 | + | 38 mm |
| E6 | ○ | 41 mm |
| E8 | ○ | 38 mm |
| C1 | ○ | 53 mm |
| C2 | — | — |

TABLE 5

Results of testing of the defoamers in surfactant formulation 4

| Example | Compatibility | Maximum foam height at 80° C. and 80 l/h |
|---|---|---|
| None | + | 78 mm |
| E4 | + | 51 mm |
| E5 | ○ | 56 mm |
| E6 | + | 53 mm |
| E7 | + | 33 mm |
| C1 | ○ | 54 mm |
| C2 | — | — |

The invention claimed is:

1. A composition comprising
(A) polysiloxane copolymers prepared by
in a 1st step
reacting organopolysiloxanes (1) which have per molecule at least one Si-bonded hydrogen atom, with substantially linear oligomeric or polymeric compounds (2) of the formula $$R^1\text{-}(A\text{-}C_nH_{2n})_m\text{-}A^1\text{-}H \tag{I},$$

where $R^1$ is a monovalent, optionally substituted hydrocarbon radical, which is hydrosilylatable by Si—H groups in a hydrosilylation reaction,
A is a divalent, polar organic radical selected from the group consisting of —O—, —C(O)—O—, —O—C(O)—, —O—C(O)—O—, —C(O)—NH—, —NH—C(O)—, urethane radicals and urea radicals, and mixtures thereof,
$A^1$ is a divalent, polar organic radical selected from the group consisting of —O—, —NH, NR'—, and mixtures thereof where R' is a monovalent hydrocarbon radical having 1 to 18 carbon atoms,
n is an integer from 1 to 20, and
m is an integer,
with the proviso that the m units $(A\text{-}C_nH_{2n})$ are identical or different, to form intermediates (4) containing H-$A^1$ groups, and
in a 2nd step
reacting the resultant intermediates (4) containing H-$A^1$ groups, with organic compounds (5) which have per molecule at least two isocyanate groups, and also, optionally, with further compounds (7) which are reactive with isocyanate groups,
(B) organopolysiloxane resins comprising units of the formula $$R^8_g(R^9O)_h SiO_{(4-g-h)/2} \tag{VI},$$

in which
$R^8$ are identical or different, and are hydrogen or a monovalent SiC-bonded hydrocarbon radical,
$R^9$ are identical or different and are hydrogen or a monovalent, optionally substituted hydrocarbon radical,
g is 0, 1, 2 or 3, and
h is 0, 1, 2 or 3,
with the proviso that the sum g+h≦3 and in less than 50% of all of the units of the formula (VI) in the organopolysiloxane resin the sum g+h is 2,
with the proviso that the composition does not contain polyorganosiloxanes in which more than 90% of the units are difunctional units of the formula formula $SiR'_2O_{2/2}$ where R' is a hydrocarbon radical.

2. The composition of claim 1, wherein the composition is free of highly disperse silica.

3. The composition of claim 1, comprising
(A) polysiloxane copolymers prepared by
in a 1st step
reacting organopolysiloxanes (1) which have per molecule at least one Si-bonded hydrogen atom, with substantially linear oligomeric or polymeric compounds (2) of the formula $$R^1\text{-}(A\text{-}C_nH_{2n})_m\text{-}A^1\text{-}H \tag{I},$$

where $R^1$ is a monovalent, optionally substituted hydrocarbon radical which is hydrosilylatable by Si—H groups in a hydrosilylation reaction,
A is a divalent, polar organic radical selected from the group consisting of —O—, C(O)—O—, —O—C(O)—, —O—C(O)—O—, —C(O)—NH—, —NH—C(O)—, urethane radical and urea radical,
$A^1$ is a divalent, polar organic radical selected from the group consisting of —O—, —NH, —NR', and mixtures thereof where R' is a monovalent hydrocarbon radical having 1 to 18 carbon atoms,
n is an integer from 1 to 20, and
m is an integer,
with the proviso that the m units $(A\text{-}C_nH_{2n})$ may be identical or different, to form an intermediate (4) containing H-$A^1$ groups, and
in a 2nd step
reacting the resultant intermediates (4) containing H-$A^1$ groups, with organic compounds (5) which have per molecule at least two isocyanate groups, and also, optionally, with further compounds (7) which are reactive with isocyanate groups, (B) organopolysiloxane resins comprising units of the formula $$R^8_g(R^9O)_h SiO_{(4-g-h)/2} \tag{VI},$$

in which
$R^8$ are identical or different, and are hydrogen or a monovalent SiC-bonded hydrocarbon radical,
$R^9$ are identical or different and are hydrogen or a monovalent, optionally substituted hydrocarbon radical,
g is 0, 1, 2 or 3, and
h is 0, 1, 2 or 3,
with the proviso that the sum g+h≦3 and in less than 50% of all of the units of the formula (VI) in the organopolysiloxane resin the sum g+h is 2, (C) optionally polyether-modified siloxanes different from (A),
(D) optionally organic compounds,
(E) optionally water, and
(F) optionally further additives.

4. The composition of claim 1, wherein organopolysiloxanes (1) are linear, cyclic or branched organopolysiloxanes comprising units of the formula $$R_e H_f SiO_{(4-e-f)/2} \tag{II}$$

where
R are identical or different and are a monovalent, optionally substituted hydrocarbon radical having 1 to 18 carbon atoms per radical,
e is 0, 1, 2 or 3, and
f is 0, 1 or 2,
with the proviso that the sum e+f is 0, 1, 2 or 3 and per molecule there is at least one Si-bonded hydrogen atom.

5. The composition of claim 1, wherein the further compounds (7) are compounds selected from the group consisting of $$R^4\text{-}(A\text{-}C_nH_{2n})_m\text{-}A^1\text{-}H \qquad (VII),$$

$$HO\text{—}R^5\text{—}NR^4\text{—}R^5\text{—}OH \qquad (VIII),$$

$$HO\text{—}R^5\text{—}NR^4_2 \qquad (IX),$$

$$HO\text{—}R^6(NR^4_2)_2 \qquad (X),$$

$$HO\text{—}R^7(NR^4_2)_3 \qquad (XI),$$

$$(HO)_2R^6\text{—}NR^4_2 \qquad (XII), \text{ and}$$

$$HNR^4_2 \qquad (XIII),$$

where $R^4$ is a hydrogen atom or a radical R, optionally containing one or more nitrogen atoms,
$R^5$ are identical or different and are divalent hydrocarbon radicals having 1 to 10 carbon atoms per radical,
$R^6$ is a trivalent organic radical having 1 to 100 carbon atoms per radical and containing one or more oxygen atoms, and
$R^7$ is a tetravalent organic radical having 1 to 100 carbon atoms per radical and containing one or more oxygen atoms.

6. The composition of claim 3, wherein the further compounds (7) are compounds selected from the group consisting of $$R^4\text{-}(A\text{-}C_nH_{2n})_m\text{-}A^1\text{-}H \qquad (VII),$$

$$HO\text{—}R^5\text{—}NR^4\text{—}R^5\text{—}OH \qquad (VIII),$$

$$HO\text{—}R^5\text{—}NR^4_2 \qquad (IX),$$

$$HO\text{—}R^6(NR^4_2)_2 \qquad (X),$$

$$HO\text{—}R^7(NR^4_2)_3 \qquad (XI),$$

$$(HO)_2R^6\text{—}NR^4_2 \qquad (XII), \text{ and}$$

$$HNR^4_2 \qquad (XIII),$$

where $R^4$ is a hydrogen atom or a radical R, optionally containing one or more nitrogen atoms,
$R^5$ are identical or different and are divalent hydrocarbon radicals having 1 to 10 carbon atoms per radical,
$R^6$ is a trivalent organic radical having 1 to 100 carbon atoms per radical and containing one or more oxygen atoms, and
$R^7$ is a tetravalent organic radical having 1 to 100 carbon atoms per radical and containing one or more oxygen atoms.

7. The composition of claim 5, wherein the further compounds (7) are compounds selected from the group consisting of $$R^4\text{-}(A\text{-}C_nH_{2n})_m\text{-}A^1\text{-}H \qquad (VII),$$

$$HO\text{—}R^5\text{—}NR^4\text{—}R^5\text{—}OH \qquad (VIII),$$

$$HO\text{—}R^5\text{—}NR^4_2 \qquad (IX),$$

$$HO\text{—}R^6(NR^4_2)_2 \qquad (X),$$

$$HO\text{—}R^7(NR^4_2)_3 \qquad (XI),$$

$$(HO)_2R^6\text{—}NR^4_2 \qquad (XII), \text{ and}$$

$$HNR^4_2 \qquad (XIII),$$

where $R^4$ is a hydrogen atom or a radical R, optionally containing one or more nitrogen atoms,
$R^5$ are identical or different and are divalent hydrocarbon radicals having 1 to 10 carbon atoms per radical,
$R^6$ is a trivalent organic radical having 1 to 100 carbon atoms per radical and containing one or more oxygen atoms, and
$R^7$ is a tetravalent organic radical having 1 to 100 carbon atoms per radical and containing one or more oxygen atoms.

8. The composition of claim 1, comprising
(A) 10% to 98% by weight of polysiloxane copolymers,
(B) 0.1% to 20% by weight of organopolysiloxane resins,
(C) 0% to 60% by weight of polyether-modified siloxanes which are different from (A),
(D) 0% to 60% by weight of organic silicon-free compounds,
(E) 0% to 60% by weight of water, and
(F) 0% to 5.0% by weight of further additives,
based in each case on the total weight of the composition.

9. The composition of claim 1, comprising
(A) 30% to 90% by weight of polysiloxane copolymers,
(B) 1% to 10% by weight of organopolysiloxane resins,
(C) 0% to 40% by weight of polyether-modified siloxanes which are different from (A),
(D) 5% to 40% by weight of organic silicon-free compounds,
(E) 0% to 10% by weight of water, and
(F) 0% to 2.0% by weight of further additives,
based in each case on the total weight of the composition.

10. A liquid wetting, detergent or cleaning material comprising the composition of claim 1.

11. A method for defoaming and/or preventing foam in a medium, wherein a composition of claim 1 is mixed with the medium.

12. The method of claim 11, wherein the composition is added in amounts of 0.1 ppm by weight to 1% by weight to a ready-to-use foaming medium.

* * * * *

UNITED STATES PATENT AND TRADEMARK OFFICE
CERTIFICATE OF CORRECTION

| | |
|---|---|
| PATENT NO. | : 8,084,566 B2 |
| APPLICATION NO. | : 13/129159 |
| DATED | : December 27, 2011 |
| INVENTOR(S) | : Holger Rautschek |

It is certified that error appears in the above-identified patent and that said Letters Patent is hereby corrected as shown below:

Column 18, Line 1, Claim 7:

After "The composition of claim" Delete "5" and Insert -- 4 --.

Signed and Sealed this
Eighteenth Day of September, 2012

David J. Kappos
*Director of the United States Patent and Trademark Office*